US010212080B2

(12) United States Patent
Diancin et al.

(10) Patent No.: US 10,212,080 B2
(45) Date of Patent: Feb. 19, 2019

(54) WIRELESS MESH NETWORK ANALYSIS AND CONFIGURATION

(71) Applicant: Fisher-Rosemount Systems, Inc., Round Rock, TX (US)

(72) Inventors: Wynn Gervacio Diancin, Bataan (PH); Nicholas T. Meyer, Crystal, MN (US); Wendy Geneva Santos Leonor, Valenzuela (PH); Patrick Pererras Natividad, Cainta (PH)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 29 days.

(21) Appl. No.: 15/136,390

(22) Filed: Apr. 22, 2016

(65) Prior Publication Data

US 2017/0310590 A1    Oct. 26, 2017

(51) Int. Cl.
*H04W 72/04* (2009.01)
*H04L 12/741* (2013.01)
*H04L 29/08* (2006.01)
*H04W 84/18* (2009.01)

(52) U.S. Cl.
CPC ............ *H04L 45/745* (2013.01); *H04L 67/02* (2013.01); *H04W 72/048* (2013.01); *H04W 84/18* (2013.01)

(58) Field of Classification Search
None
See application file for complete search history.

(56) References Cited

U.S. PATENT DOCUMENTS

| 2005/0232281 | A1* | 10/2005 | Rosenzweig | ......... H04L 12/185 370/400 |
| 2007/0150565 | A1 | 6/2007 | Ayyagari et al. | |
| 2009/0037773 | A1* | 2/2009 | Archer | ................ H04L 41/0677 714/37 |
| 2009/0059814 | A1 | 3/2009 | Nixon et al. | |
| 2009/0265635 | A1* | 10/2009 | Citrano, III | ........... H04W 24/00 715/734 |

(Continued)

FOREIGN PATENT DOCUMENTS

| CA | 2733268 A1 | 4/2010 |
| WO | 2014202664 A1 | 12/2014 |

OTHER PUBLICATIONS

"Execute",Engineering Guidelines, Section 6, dated Feb. 2016, 1 page.

(Continued)

*Primary Examiner* — Xavier Szewai Wong
(74) *Attorney, Agent, or Firm* — Christopher R. Christenson; Kelly, Holt & Christenson, PLLC

(57) ABSTRACT

A system and method for configuring wireless process mesh networks is provided. The system includes a processor, user interface module, memory, and an analysis module. The user interface module is configured to generate a user interface to receive user-provided mesh network design parameters. Memory is coupled to the processor and stores information indicative of a plurality of wireless process mesh networks and associated wireless field devices. The analysis module is configured to analyze the information indicative of the plurality of wireless process mesh networks and generate an alternate wireless mesh network configuration based on the user-provided mesh network design parameters.

19 Claims, 11 Drawing Sheets

(56) References Cited

U.S. PATENT DOCUMENTS

| | | | |
|---|---|---|---|
| 2010/0214979 A1* | 8/2010 | Kuehnel | H04L 41/00 370/328 |
| 2011/0164512 A1 | 7/2011 | Citrano, III et al. | |
| 2014/0310243 A1* | 10/2014 | McGee | G06F 17/30575 707/639 |
| 2015/0050936 A1* | 2/2015 | Brown | H04W 40/22 455/445 |
| 2016/0094398 A1 | 3/2016 | Choudhury et al. | |
| 2016/0191357 A1* | 6/2016 | Orner | H04L 41/12 370/328 |

OTHER PUBLICATIONS

"AMS Wireless SNAP-ON Application", AMS Suite: Intelligent Device Manager, Product Data Sheet, Emerson Process Management, dated Apr. 2015, 3 pages.
Search Report for United Kingdom Patent Application No. GB1705933.8, dated Aug. 25, 2017, 3 pages.

* cited by examiner

WIRELESS MESH NETWORK ANALYSIS AND CONFIGURATION

BACKGROUND

WirelessHART is a wireless process communication standard that is globally approved as IEC 62591. Wireless process mesh networks in accordance with the WirelessHART standard generally employ an interoperable, self-organizing mesh technology. WirelessHART process mesh networks communicate with host systems securely and reliably, and can be used for both control and monitoring applications. A WirelessHART network is a multi-hop communication network that is generally composed of a wireless gateway and one or more WirelessHART devices. The network is typically organized in a mesh topology and each wireless field device in the network is capable of routing messages from other wireless field devices in an effort to relay data to the wireless gateway. The term "self-organizing" refers to the capability of WirelessHART networks to automatically establish and reconfigure redundant communication paths for sending messages between nodes (wireless field devices on the network). This capability makes WirelessHART networks more robust against interference and obstructions.

SUMMARY

A system and method for configuring wireless process mesh networks is provided. The system includes a processor, user interface module, memory, and an analysis module. The user interface module is configured to generate a user interface to receive user-provided mesh network design parameters. Memory is coupled to the processor and stores information indicative of a plurality of wireless process mesh networks and associated wireless field devices. The analysis module is configured to analyze the information indicative of the plurality of wireless process mesh networks and generate an alternate wireless mesh network configuration based on the user-provided mesh network design parameters.

DETAILED DESCRIPTION

Figure 1:
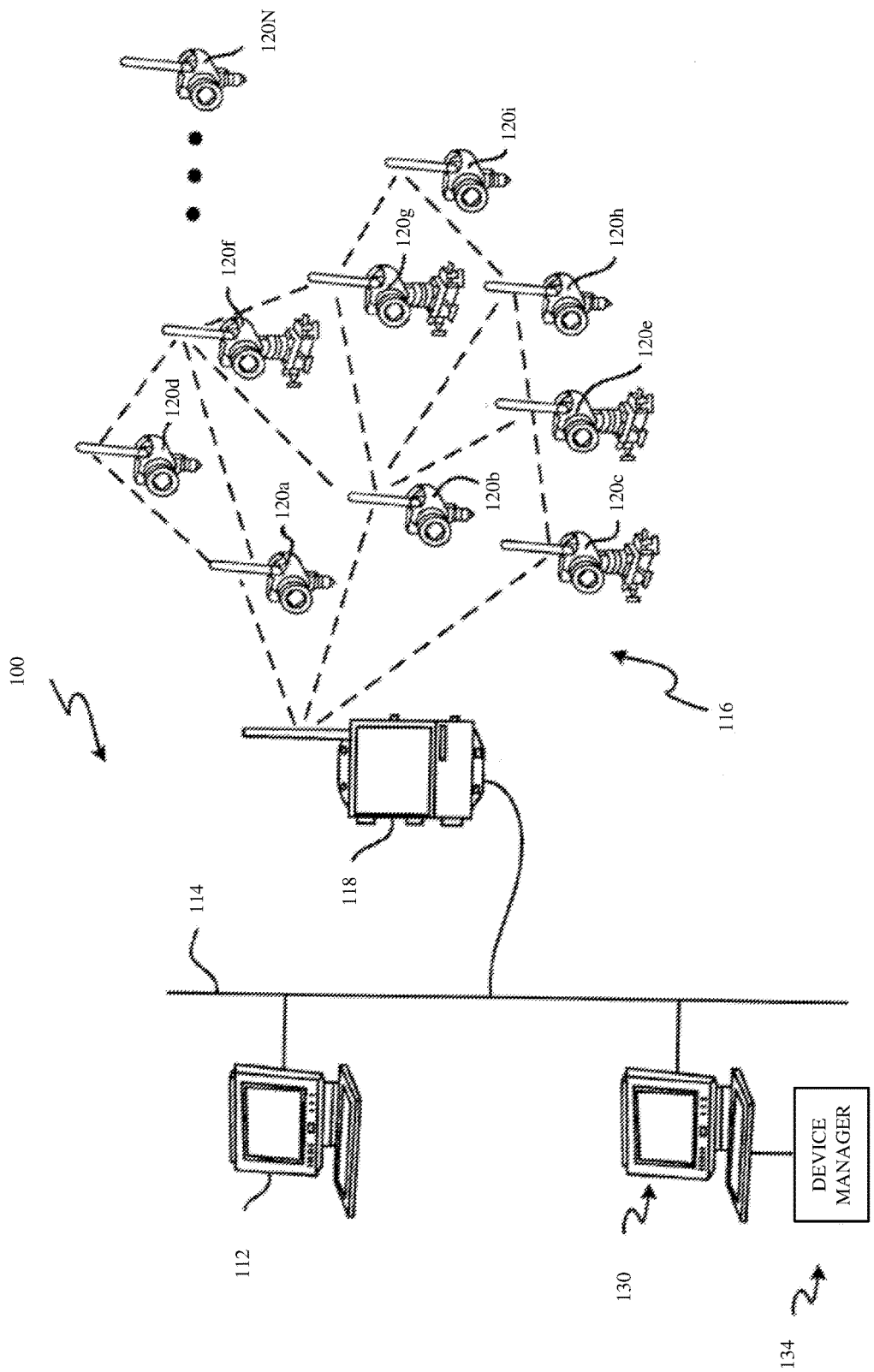
FIG. 1 is a diagrammatic view of a process communication system with which embodiments of the present invention are particularly useful.

FIG. 1 is a diagrammatic view of a process monitoring and control system 100 that includes a host computing device 112, high speed data network 114, wireless process mesh network 116 (which includes wireless gateway 118 and field devices 120a-120i . . . 120N), and network-connected computing device 130. Wireless gateway 118 couples wireless process mesh network 116 with host 112 via high speed data network 114. Data may be transmitted from host 112 to wireless gateway 118 over communication network 114, which data may then be transmitted to a selected wireless field device of wireless mesh network 116. Data may be also be transmitted from a given wireless field device to wireless gateway 118 over wireless process mesh network 116, which data may then be transmitted to host 112 over communication network 114. As a mesh network, network 116 may provide several different routes by which data may travel from wireless gateway 118 to the selected wireless field device. Conversely, when a wireless field device, such as wireless field device 120 needs to pass messages and/or data to host 112, such messages and/or data are generally may be routed in various ways across wireless mesh network 116 to wireless gateway 118.

Host computer 112, while illustrated as a single computer, may, in fact, comprise any number of servers and/or programs working together to provide application programs that facilitate process monitoring and control by sending messages to field devices 120a-120N. Host 112 can execute suitable asset management system software, such as AMS-Suite: Intelligent Device Manager, available from Fisher-Rosemount Systems, Inc. of Austin, Tex.

Wireless gateway 118 communicates with host computer 112 and/or network-connected computing device 130 over high speed data network 114 using any suitable communication protocol. In one embodiment, network 114 may be an Ethernet network supporting TCP/IP using an Ethernet interface. In other embodiments, high speed data network 114 may be an RS-485 two-wire communication link. Wireless gateway 118 can be any suitable device that is able to communicate with one or more network-connected devices via high speed data communication network 114 and then generate corresponding wireless communication to one or more wireless field devices via mesh network 116. In one embodiment, wireless gateway 118 is that sold under the designation Smart Wireless Gateway 1420, available from Emerson Process Management of Austin, Tex.

Wireless gateway 118 communicates with wireless devices 120a-120N using a wireless process communication protocol such as WirelessHART in accordance with IEC 62591. While the remaining description herein will be provided with respect to WirelessHART process mesh networks, it is expressly contemplated that other wireless process communication mesh networks can be used in accordance with embodiments described herein. Wireless gateway 118 may include the functionality of a network manager that may be provided as software executing within a processor of wireless gateway 118 in order to define communication paths between wireless gateway 118 and the various wireless field devices 120a-120N.

In the design of a wireless process communication mesh network, it is generally advantageous to scope the wireless process mesh network to a single process unit. Moreover, it is also advantageous to minimize or reduce the number of hops that messages or data must traverse from a given wireless field device to a wireless gateway in order to reduce latency. This is especially so for wireless process mesh networks that execute time-sensitive control operations. Ensuring that each wireless field device on the mesh network has multiple neighbors within range also results in a more reliable wireless mesh network. Each wireless field device on the mesh network should have a minimum of three wireless field devices within direct communicative range of the given wireless field device in order to provide suitable redundant communication paths. Further still, it is also a design goal of wireless process mesh networks to specify a minimum number of wireless field devices that are directly capable of interacting with the wireless gateway. For example, it may be beneficial to specify that at least 25 percent or even 35 percent of the wireless field devices on the mesh network are able to communicate directly with the wireless gateway. This ensures that there are a variety of available data communication paths to/from the wireless gateway.

As the number of wireless field devices increases, the communication constraints through the wireless field devices that are able to directly to communicate with the wireless gateway may constrain the communication effectiveness of the wireless mesh network. Further still, the processing power and/or communication bandwidth of the wireless gateway itself, has a finite limit such that only a certain number of wireless field devices can be effectively serviced on a given wireless process communication mesh network. Thus, there are a number of situations in which it is beneficial for a single process installation to add additional wireless process mesh networks. In order to add an additional mesh network, an additional wireless gateway is communicatively coupled to the data communication network 114, placed in a suitable location in the process installation, and configured using suitable tools on host 112, network-connected computer 130 or a handheld configuration device.

When it becomes desirable to add an additional wireless process mesh network to a process installation, the procedure is not trivial. Mesh networks are made increasingly robust as they acquire new nodes (wireless field devices). Thus, starting a new wireless process mesh network with relatively few nodes will cause the new wireless process mesh network to be relatively brittle even while it may have excess capacity. In contrast, a wireless process mesh network that is operating at capacity may be very robust, but may have performance issues. Accordingly, it is generally advantageous to split a wireless process mesh network when a new wireless process mesh network is added. By splitting the networks, both networks will have additional capacity, reduced performance issues, and increased robustness (in comparison to the second network having very few nodes).

In the process of adding a new wireless process mesh network to a process installation, a location of the new wireless gateway will need to be determined. Additionally, when a first wireless process mesh network is split, it must be determined which wireless field devices will be moved from the first (original) wireless process mesh network to the second (new) wireless process mesh network. This process can be affected by physical obstructions that may interfere with signals in the process installation.

Figure 2:
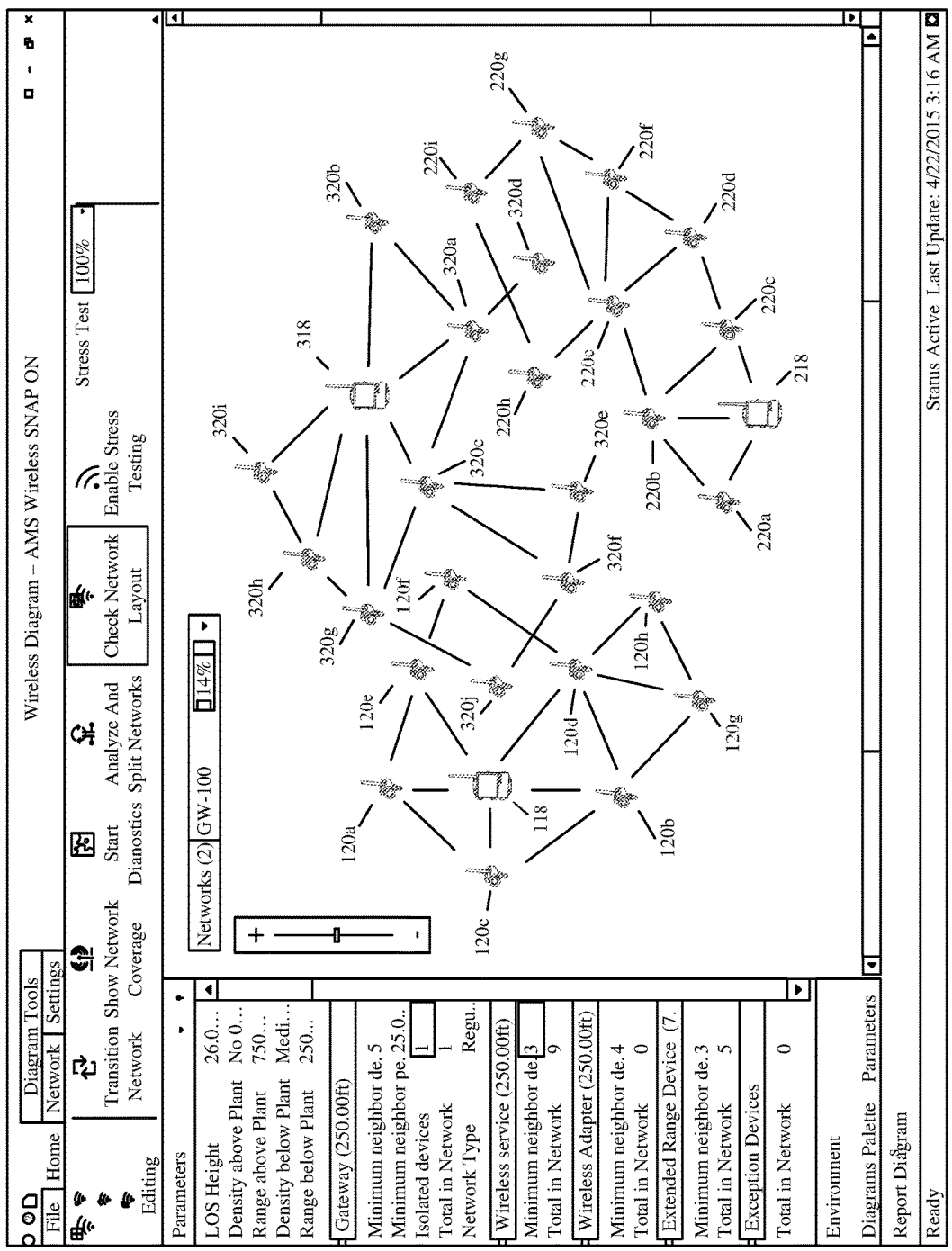
FIG. 2 is a diagrammatic view of a screen of a graphical user interface depicting three distinct wireless process communication networks operating in geographically overlapping space.

FIG. 2 is a diagrammatic view of a screen of a graphical user interface depicting three distinct wireless process communication networks operating in geographically overlapping space. The graphical user interface allows a user to place each wireless field device and wireless gateway on a graphical representation of the process installation and automatically analyze the wireless process mesh network(s) in order to generate network configurations that improve an overall compliance of the various wireless process mesh networks with user-provided design constraints.

Each wireless gateway 118, 218, 318 is shown communicatively coupled to a plurality of wireless process field devices. In the example shown in FIG. 2, wireless gateway 118 is communicatively coupled to wireless field devices 120a, 120b, 120c, 120d, 120e, 120f, 120g, and 120h. Additionally, each of wireless field devices 120a-120e is able to communicate directly with wireless gateway 118. Wireless field devices 120f, 120g, and 120h, however, must communicate with wireless gateway 118 through other wireless field devices.

A second wireless process mesh network is comprised of wireless gateway 218, and wireless field devices 220a, 220b, 220c, 220d, 220e, 220f, 220g, 220h, and 220i. As shown in FIG. 2, each of wireless field devices 220a-220c is able to communicate directly with wireless gateway 218, while the remaining wireless field devices 220d-220i communicate using one or more hops through a neighbor wireless field device on the second wireless process mesh network.

A third wireless process mesh network is comprised of wireless gateway 318 coupled to field devices 320a, 320b, 320c, 320d, 320e, 320f, 320g, 320h, 320i, and 320j. As shown in FIG. 2, each of wireless field devices 320a-320c, 320g, 320h, and 320i is able to communicate directly with wireless gateway 318, while the remaining wireless field devices 320d-320f, and 320j communicate using one or more hops through a neighbor wireless field device on the third wireless process mesh network.

WirelessHART process mesh networks, even when operating in relatively close physical proximity with each other, will have no awareness of the other WirelessHART networks. Further still, the "self-organizing" capability does not extend across different wireless process mesh networks. This means that the wireless process mesh networks cannot repurpose a wireless field device from one wireless process mesh network to another wireless process mesh network in order to correct a deficiency. Likewise, it is also not possible for a wireless process mesh network that has reached its capacity limit to offload or otherwise move wireless field devices to less-utilized wireless process mesh networks. In the example shown in FIG. 2, wireless field device 320d has only a single wireless communication path to wireless field device 320a and thus lacks redundant communications. This is so even though wireless field device 320d is in relatively close proximately, and communicative range with wireless field devices 220e, 220g, 220h, and 220i.

Embodiments of the present invention generally provide a system and method that allow a user or technician to analyze, visualize, and generate wireless process network configuration relative to a plurality of WirelessHART networks. A tool in accordance with embodiments described herein generally receives and/or gathers information about and/or from each WirelessHART network. Such information can include, without limitation, path stability, neighbors, device status, update rate, recommended capacity, and maximum capacity. Additionally, a tool in accordance with an embodiment of the present invention can receive one or more design parameters from a user or technician in order to analyze the information about and/or received from the WirelessHART networks in order to provide wireless process mesh network configurations and/or recommendations. Examples of design parameters that may be received from a user or technician include a minimum number of neighbors required per wireless field device, and effective range for the wireless gateway and/or wireless field devices, as well as a minimum number of wireless field devices that are required to be directly within a gateway's effective range relative to the total number of devices on the wireless process mesh network. Finally, a tool in accordance with embodiments described herein may receive information about the physical layout of the process installation as well as locations of all wireless field devices and wireless gateways. Further, one or more physical obstructions in the process installation. Such information may be provided in the form of a graphical representation generated or uploaded by a user on a graphical software tool relative to one or more of the wireless process mesh networks.

Figure 3:
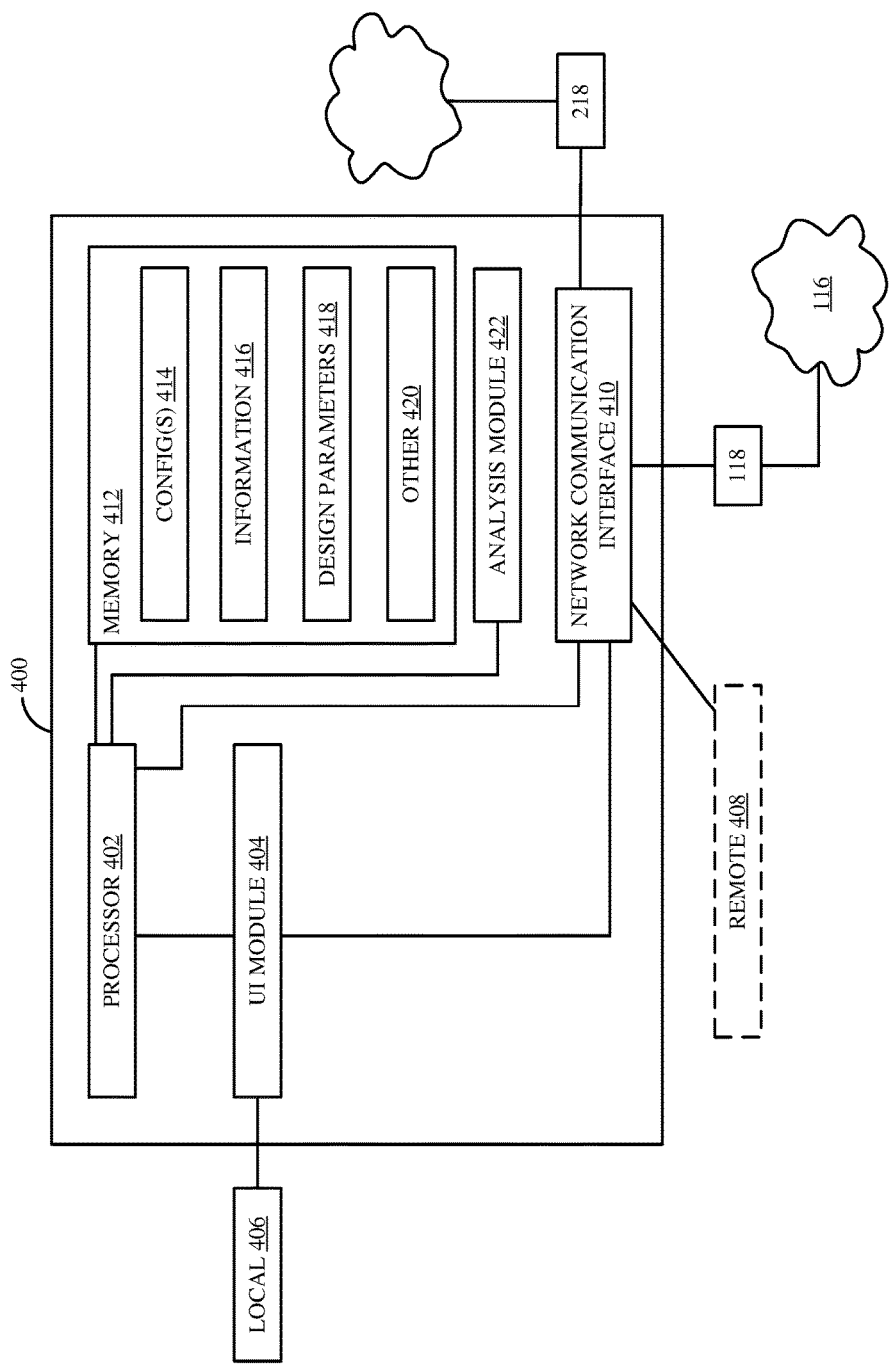
FIG. 3 is a diagrammatic view of a computer-based network analysis and configuration tool in accordance with an embodiment of the present invention.

FIG. 3 is a diagrammatic view of a computer-based network analysis and configuration tool in accordance with an embodiment of the present invention. Tool 400 may be embodied within or coupled to either or both of host 112, or network-connected computer 130, or any other suitable device. Tool 400 generally includes processor 402 that, in one embodiment, may comprise a microprocessor. Additionally, a user interface module 404 is embodied within or coupled to processor 402 and enables tool 400 to interact with a user via a user interface. In one embodiment, the user interface is a graphical user interface that allows the user to generate or otherwise provide a representation of the process installation within the graphical user interface. Additionally, wireless field devices and wireless gateways may be added to the representation by any suitable manner, such as dragging and dropping them, using a pointing device, such as a mouse. Then, parameters relative to each such wireless field device and wireless gateway can be entered into tool 400. The user interface may be a local user interface 408 and thus UI module 404 may provide suitable circuitry and/or logic to receive keystrokes and/or pointing device information from a user and provide an output in the form of a display generated on a monitor. Additionally, in embodiments where the user is remote from tool 400, user interface module 404 may include suitable functionality, such as providing hypertext transfer protocol (HTTP) server functionality, such that a user interface may be rendered remotely 408 to a user via network communication interface 410.

In one embodiment, tool 400 may employ network communication interface 140 to communicate over a communication network, such as network 114 to interact with remote devices. Examples of remote devices include a user interacting with a client device that couples to tool 400 over communication network 114. Additionally, each of wireless gateways 118, 218 is operatively coupled to network communication interface 410 via the communication network 114. Each respective wireless gateway 118, 218, enables communication with wireless field devices in their respective wireless process mesh networks.

Tool 400 generally includes memory 412 coupled to and/or embodied within processor 402 that stores a variety of information relative to the various wireless process mesh networks. Such information can include configuration information of one or all of the mesh networks, including geographical locations of the various field devices and/or obstructions present for each wireless process mesh network. This is indicated at block 414. Additionally, information retrieved from each wireless gateway relative to the various wireless field devices on each respective wireless process mesh network can be stored within memory 412, as indicated at block 416. Further still, design parameters 418 and other parameters 420 may be received from a user via user interface module 404. Examples of design parameters relative to wireless process mesh networks are set forth above, but specifically include: a minimum number of neighbors required for each wireless field device, an effective range for each wireless gateway and/or each wireless field device, a minimum number of field devices that are able to directly communicate with the wireless gateway and the physical characterization (shape, size, and location, of one or more obstructions present within the process installation relative to the various wireless field devices).

In some embodiments, processor 402 is able to interact with each wireless gateway via network communication interface 410 in order to enumerate all wireless process mesh networks operating in the process installation. Then, for each wireless process mesh network, processor 402 may cause each wireless gateway to identify every wireless field device on the mesh network and receive operating and/or configuration information from each wireless field device. Examples of such information include neighbors, device status, update rate, etc. Additionally, each wireless gateway can also provide gateway information including path stability, recommended capacity, and maximum capacity. Essentially, via network communication interface 410, processor 402 can obtain a wealth of information about the operating characteristics, design and configuration of each and every wireless process mesh network operating in the process installation. However, embodiments of the present invention also include obtaining all such information from a user via a graphical user interface of the software tool.

Analysis module 422 is coupled to or embodied within processor 402. Analysis module 422 may be any combination of software and hardware that cooperates to provide useful analytics in accordance with embodiments described herein. Analysis module 410 analyzes the received field device operation characteristic information, configuration information, wireless gateway operation information, wireless gateway configuration information, etc. relative to the received design parameters and provides one or more visualizations and/or wireless process mess network configurations in accordance with embodiments of the present invention. In one embodiment, tool 400 uses network design parameters 418 as well as data gathered or obtained about wireless field devices, wireless gateways, and the process installation environment in order to make, or at least facilitate, decisions for distributing wireless field devices relative to each wireless process mesh network.

In order to optimize or improve network configuration, the process of analyzing the various mesh networks is, in accordance with one embodiment, divided into three phases. In phase one, the creation of a core network is provided. The core network is comprised of wireless field devices that are closest to a wireless gateway and can communicate directly with the wireless gateway. The number of devices assigned to core networks in phase one depends on the design parameters set by the user. In phase two, the remaining wireless field devices are assigned that can reach each gateway. In this phase, the wireless field devices are added to the nearest wireless gateway with which a respective wireless field device can communicate. Finally, in phase three, the distribution of wireless field devices is performed for wireless field devices that are outside of any wireless gateway's range. These field devices require multiple hops in order to send a message or data to any wireless gateway. Phase three considers numerous factors from design parameters such as pinch points and isolated wireless field devices (i.e. wireless field devices that cannot communicate with any wireless gateway).

Figure 4:
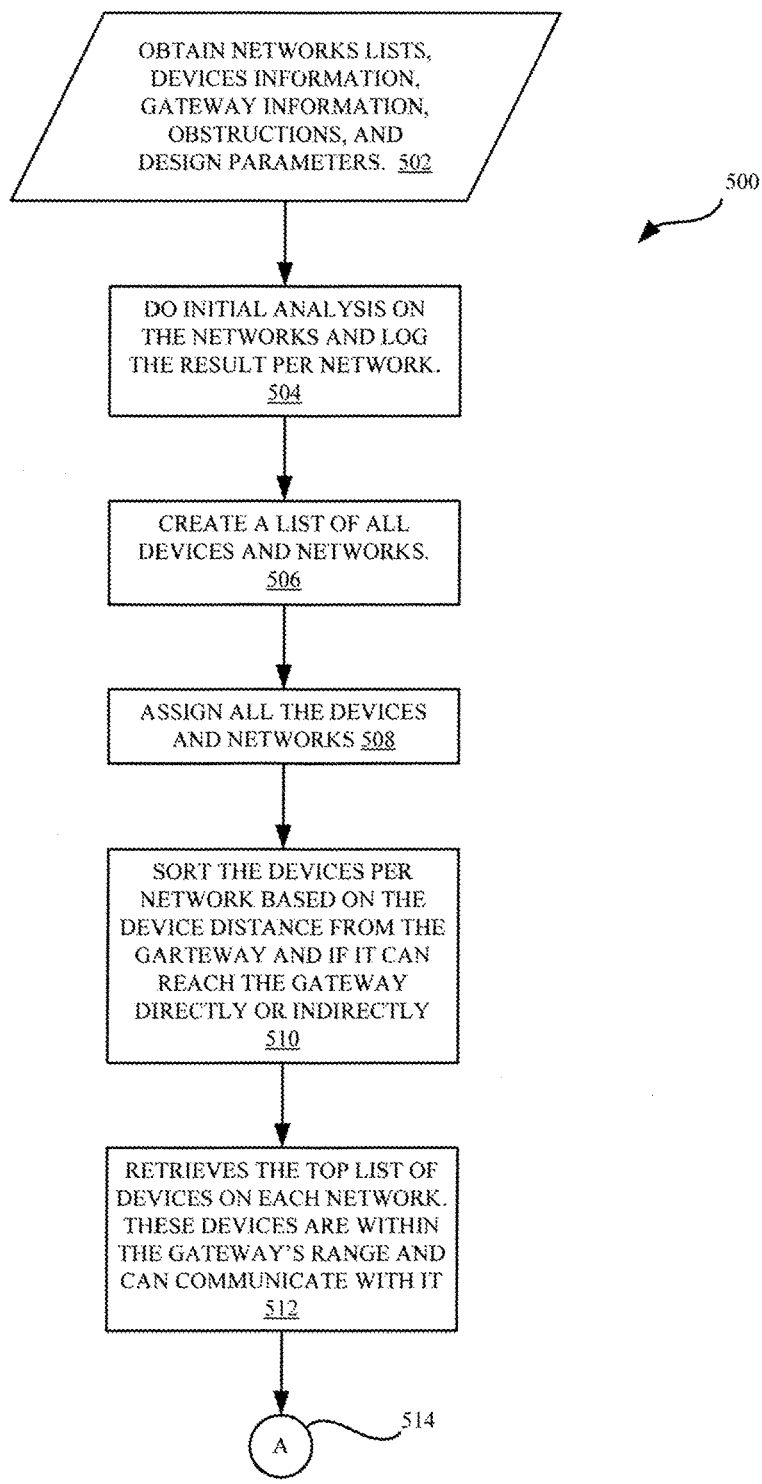
FIG. 4 is a flow diagram of a portion of method of analyzing and splitting a wireless process mesh network in accordance with an embodiment of the present invention.

FIG. 4 is a flow diagram of a method of analyzing and splitting a wireless process mesh network in accordance with an embodiment of the present invention. Method 500 begins at block 502 where network lists, wireless field device information, wireless gateway information, obstructions, and design parameters are obtained. As set forth above, wireless gateway information, wireless field device information, and network lists can be obtained by tool 400 via user input. Additionally, in some embodiments, some such information may be obtained by tool 400 by communicating via network communication interface 410. Additionally, obstruction and/or design parameters can be obtained from a user, either locally, or remotely. Once the information from block 502 is obtained, control passes to block 504 where initial analysis on the wireless process mesh networks is performed by tool 400 and a result is stored, or otherwise logged for each wireless process mesh network. Next, at block 506, a list of all wireless process field devices and all wireless process mesh networks is generated and stored. At block 508, all wireless field devices are assigned on each wireless process mesh network. At block 510, the various wireless field devices are sorted per wireless process mesh network based on the wireless field device distance from the wireless gateway and whether the respective wireless field device can reach the wireless gateway directly or indirectly. At block 512, a top list of wireless field devices is retrieved for each wireless process mesh network. The wireless field devices identified in the top list are within the wireless gateway's wireless communication range and can communicate directly with it. Next, at node 514, subsequent processing is performed, which is described in greater detail with respect to FIG. 5.

Figure 5:
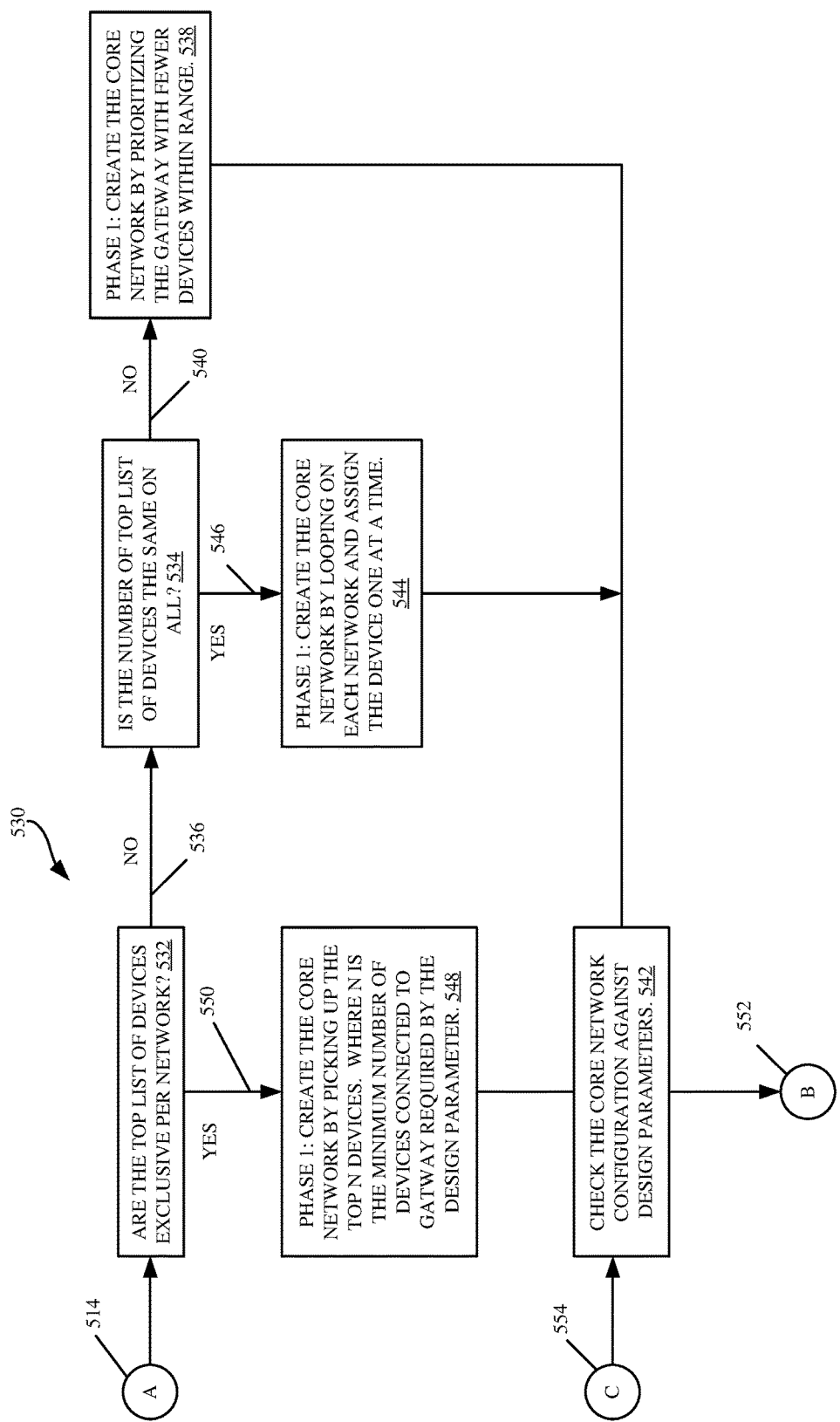
FIG. 5 is a flow diagram of another portion of a method of analyzing a splitting a wireless process mesh network in accordance with an embodiment of the present invention.

FIG. 5 is a diagrammatic view of a portion of a method of analyzing and splitting a wireless process mesh network in accordance with an embodiment of the present invention. Method 530 begins at node 514 received from block 512 in FIG. 4. At block 532, it is determined whether the top list of wireless field devices for each wireless process mesh network is exclusive. This means that no wireless field device in the identified top list for each wireless process mesh network is identified as a top wireless field device for a second or additional wireless process mesh network. If the top list of wireless field devices is not exclusive, control passes to block 534 along line 356. At block 534 it is determined whether the number of top list of wireless field devices is the same on all wireless process mesh networks. If the results is negative, control passes from block 534 to block 538 via line 540. At block 538, a core network is created by prioritizing the wireless gateway having fewer wireless field devices within range. Then, control passes to block 542 where the core network configuration is checked against the design parameters, such as design parameters 418 (shown in FIG. 3) provided by a user or technician. Returning to block 534, if the number of top list of wireless field devices is the same on all wireless process mesh networks, control passes to block 544 via line 546. At block 544, the core network is created by looping on each wireless process mesh network and assigning the wireless field device one at a time. When block 544 is complete, control passes to block 542 where the core network configuration is checked against the user-provided design parameters. Returning to block 532, if the top list of wireless field devices is exclusive per wireless process mesh network, then control passes to block 548 via line 550. At block 548, the core network is created by picking up the top N wireless field devices where N is the minimum number of devices connected to the gateway required by the user-provided design parameter. Then, control passes to block 542 where the core network configuration is checked against the user-provided design parameter. Block 542 provides node 552 as an output. Additionally, as shown in FIG. 5, block 542 can take node 554 as an input. Node 554 is described in greater detail with respect to FIG. 6.

Figure 6:
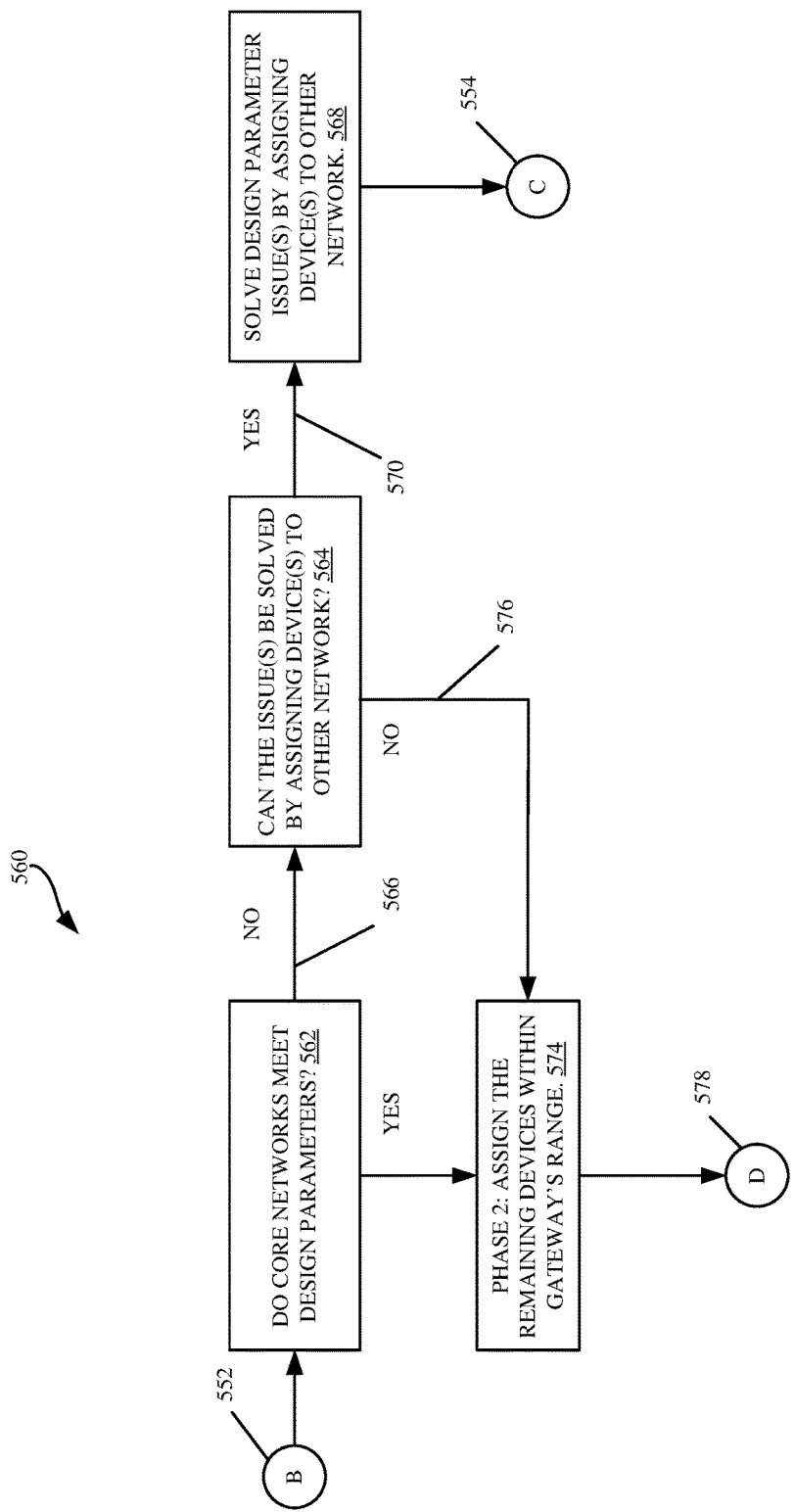
FIG. 6 is a flow diagram of a method of addressing network issues identified in accordance with an embodiment of the present invention.

FIG. 6 is a flow diagram of a method of addressing issues identified during method 530 in accordance with an embodiment of the present invention. Method 560 begins at block 562 which takes node 552 from FIG. 5, as its input. At block 562 it is determined whether the core network meets the user-provided design parameters. If the core network does not meet the design parameters, control passes to block 564 along line 566. At block 564 it is determined whether the issue can be solved by assigning one or more wireless field devices to a different wireless process mesh network. If the issue can be solved by assigning one or more wireless field devices to a different wireless process mesh network, control passes to block 568 along line 570 where the design parameter issue is solved by assigning one or more wireless field devices to the different wireless process mesh network. Method 560 then finishes at node 554, which returns control to block 542 (shown in FIG. 5). Returning to block 564, if the issue cannot be solved by assigning the one or more wireless field devices to a different wireless process mesh network, control passes to block 574 along line 576. At block 574, the remaining wireless field devices within the wireless gateway's range are assigned. Then, method 560 provides node 578 as an output. Returning to block 562, if the core networks do meet the user-provided design parameters, then control simply passes to block 574 where the remaining devices are assigned within the gateway's range.

Figure 7:
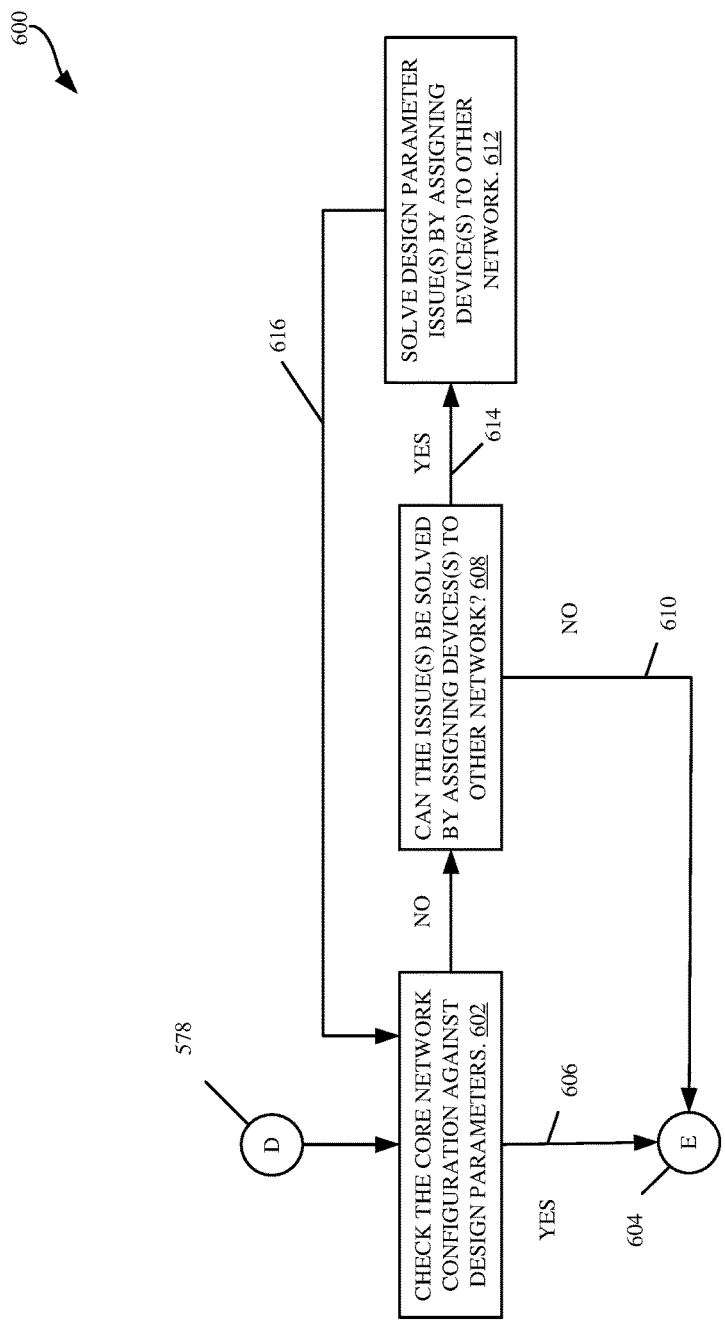
FIG. 7 is a flow diagram of a method of addressing design parameter issues identified by a computerized network analysis tool in accordance with an embodiment of the present invention.

FIG. 7 is a method of addressing design parameter issues identified by a computerized network analysis tool in accordance with an embodiment of the present invention. Method 600 begins at block 602 which takes, as an input, node 578 shown in FIG. 6. At block 602, the core network configuration is checked against the user-provided design parameters 418. If the core network configuration meets the user-provided design parameter, control passes to node 604 via line 606. If the core network configuration does not meet the user-provided design parameters, control passes to block 608 where tool 400 determines whether the issue can be solved by assigning one or more wireless field devices to a different wireless process mesh network. If the issue cannot be so solved, then control passes to node 604 via line 610. If, however, the issue can be solved by assigning one or more wireless field devices to a different wireless process mesh network, then control passes to block 612 along line 614. At block 612, the design parameter issue is solved by tool 400 by assigning the one or more wireless process field devices to the different wireless process mesh network. Control then returns to block 602 alone line 616, and the method iterates.

Figure 8:
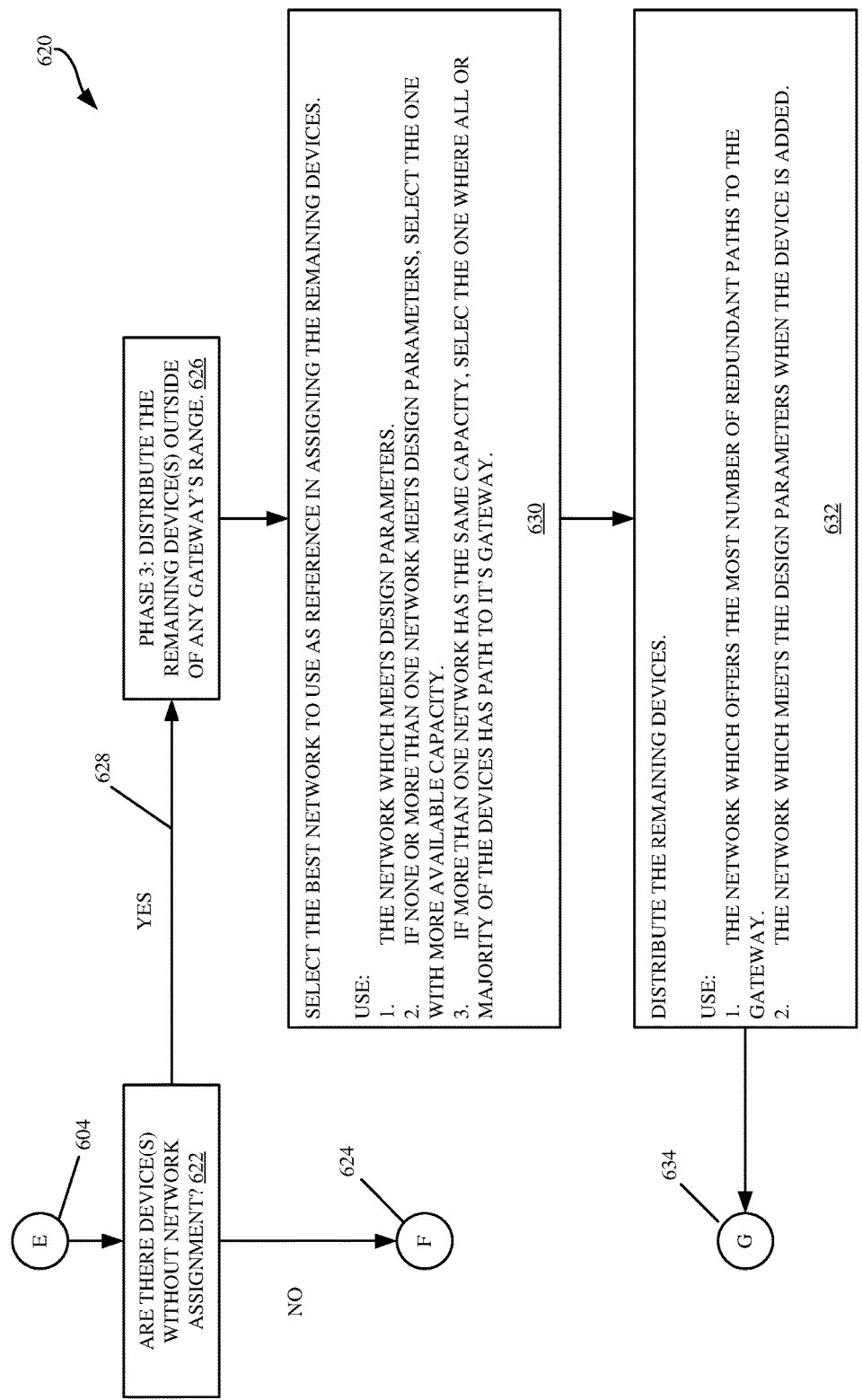
FIG. 8 is a flow diagram of a method of distributing wireless field devices that are outside of any gateway's primary wireless range in accordance with an embodiment of the present invention.

FIG. 8 is a flow diagram of a method of distributing wireless field devices that are outside of any gateway's primary wireless range in accordance with an embodiment of the present invention. Method 620 begins at block 622 where tool 400 determines if there are any wireless field devices that do not have a wireless process mesh network assignment. As indicated in FIG. 8, block 622 takes, as an input, node 604 from FIG. 7. Accordingly, block 622 executes when the core network configuration has been verified against user-specified design parameters. If, during block 622, tool 400 determines that there are no wireless field devices that do not have a wireless process mesh network assignment, control then passes to node 624. However, if at least one wireless field device exists that does not have a wireless process mesh network assignment, control passes from block 622 to block 626 via line 628. At block 626, tool 400 determines whether the remaining wireless field device(s) is outside of the direct communication range of any wireless gateway. Next, at block 630, tool 400 selects the best wireless process mesh network to use as reference in assigning the remaining wireless field devices. In this task, tool 400 will, in accordance with one embodiment, use the wireless process mesh network that meets the design parameters. If none or more than one of the wireless process mesh networks meet the user-provided design parameters, then the wireless process mesh network having more available capacity will be selected by tool 400 for assigning the remaining wireless field device(s). Further, if more than one network has the same capacity, then tool 400 will select the wireless process mesh network where all or a majority of the wireless field devices have a direct communication path to the respective wireless gateway. At block 632, the remaining wireless field devices are distributed. More specifically, tool 400 will determine the wireless process mesh network which offers the most number of redundant communication paths to the gateway. Further still, the wireless process mesh network that meets the user-provided design parameters when the wireless field device is added will be selected by tool 400. Once block 632 has completed, control passes to node 634, where additional processing is performed, which will be described in greater detail below with respect to FIG. 9.

Figure 9:
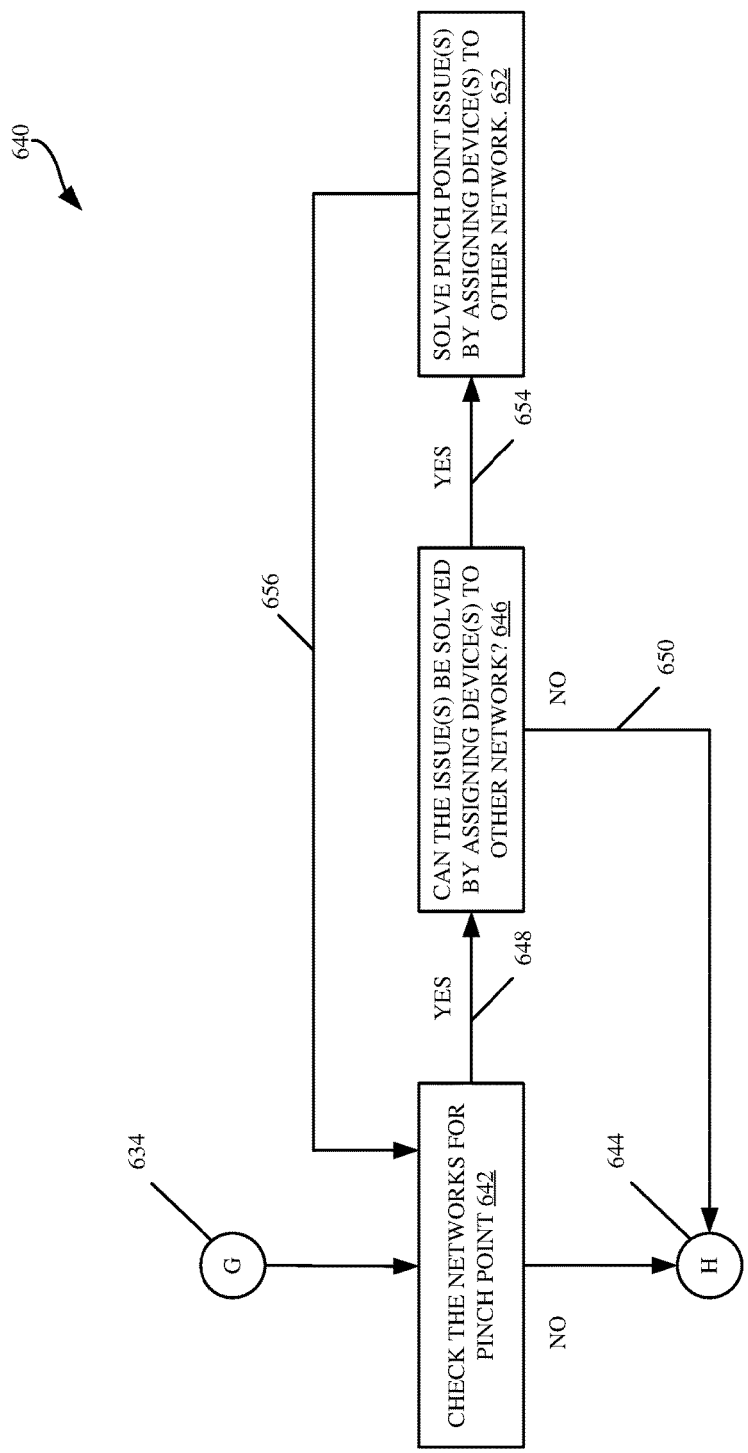
FIG. 9 is a flow diagram of a method of identifying and fixing pinch points during wireless process mesh network configuration in accordance with an embodiment of the present invention.

FIG. 9 is a flow diagram of a method of identifying and fixing pinch points during wireless process mesh network configuration in accordance with an embodiment of the present invention. Method 640 begins at block 642 which takes node 634 (from FIG. 8) as an input. Accordingly, block 642 is executed by tool 400 when the various remaining wireless field devices have been distributed from block 632. At block 642, tool 400 checks the wireless process mesh networks in order to identify pinch points. As used herein, a pinch point is a wireless field device that, if it were to cease communication, would render another wireless field device with no communicative path to the mesh network. Referring back to the mesh network shown in FIG. 2, since wireless field device 320d has a single communication path to wireless gateway 318 that must necessarily pass through wireless field device 320a, wireless field device 320a is a pinch point. If there are no pinch points in any of the wireless process mesh networks, control passes to node 644 which will be described in greater detail with respect to FIG. 10. If, however, there is at least one pinch point identified at block 642, then control passes to block 646 via line 648. At block 646, tool 400 determines whether the pinch point can be solved by assigning one or more wireless field devices to a different wireless process mesh network. If the answer is in the negative, then control passes to node 644 via line 650. However, if the issue can be solved by assigning one or more wireless field devices to a different wireless process mesh network, then control passes to block 652 via line 654. At block 652, tool 400 solves one or more pinch point issues by assigning one or more wireless field devices to a different wireless process mesh network. Once these assignments have occurred, control returns to block 642 via line 656 and the various wireless process mesh networks are checked again for the presence of any pinch points.

Figure 10:
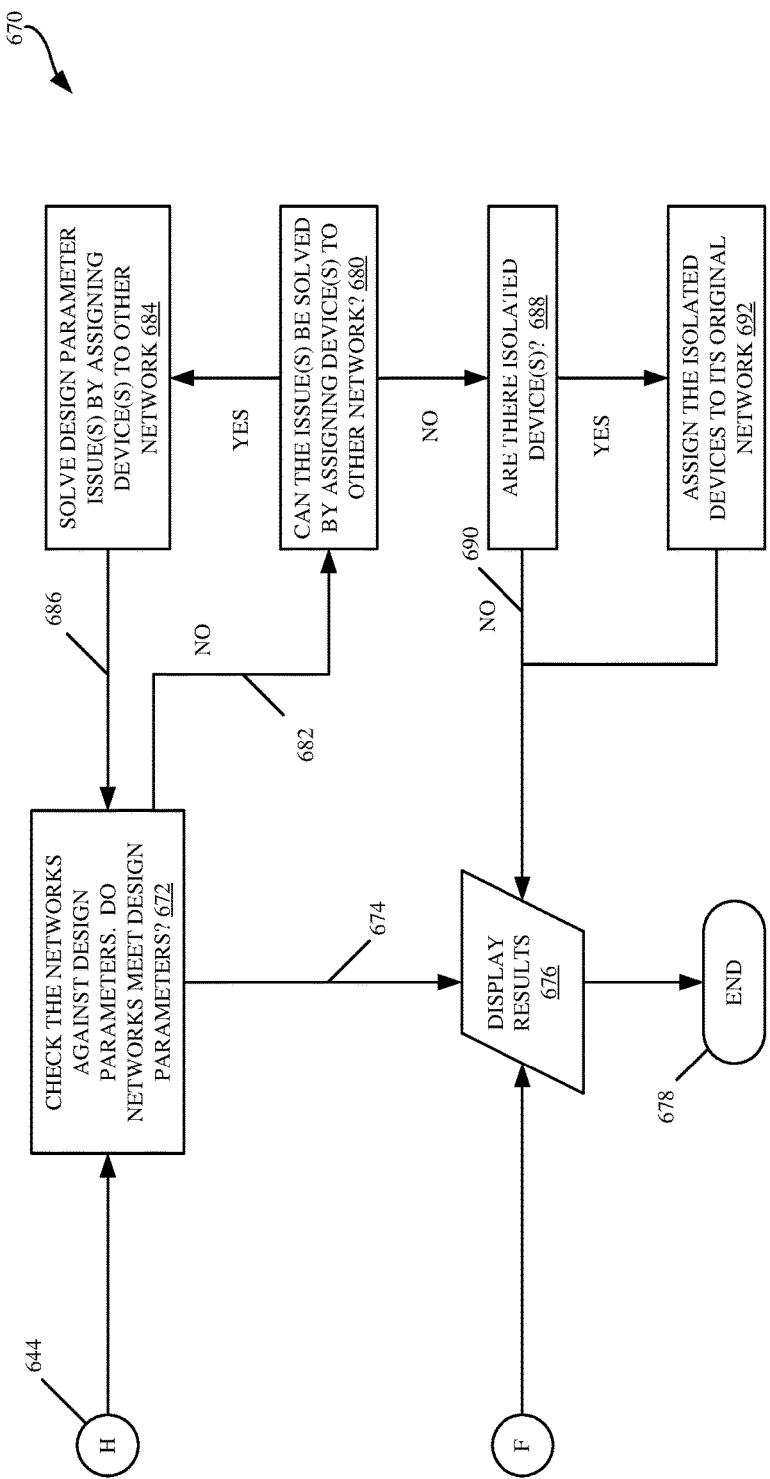
FIG. 10 is a flow diagram of a method of remedying design parameter issues identified during wireless process mesh network configuration in accordance with an embodiment of the present invention.

FIG. 10 is a flow diagram of a method of remedying design parameter issues identified during wireless process mesh network configuration in accordance with an embodiment of the present invention. Method 670 begins at block 672 where the wireless process mesh networks are checked by tool 400 against the user-provided design parameters 418. As shown in FIG. 10, block 672 takes, as an input, the network configuration provided at node 644 (shown in FIG. 9). At block 672, tool 400 determines whether all wireless process mesh networks meet the design parameters provided by the user. If the answer is in the affirmative, control passes along line 674 to block 676 where the results are displayed to the user either locally, such as via a local 406 display, or remotely via a remote 408 connection. Once the results are displayed, block 670 ends at node 678. If, however, at least one wireless process mesh network does not meet the user-provided design parameters, control passes from block 672 to block 680 via line 682. At block 680, tool 400 determines whether the issue can be solved by assigning one or more wireless field devices to a different wireless process mesh network. If the answer is in the affirmative, control passes to block 684 where tool 400 assigns the one or more wireless field devices to a different wireless process mesh network. Once these assignments are complete, control returns to block 672 via line 686, and the method repeats. If, however, at block 680 tool 400 determines that the issues cannot be solved by assigning one or more wireless field devices to a different wireless process mesh network, then control passes to block 688 where tool 400 determines if there are any isolated wireless field devices. As defined herein, an isolated field device is a wireless field device with no communicative path to the process installation. If no such isolated wireless field devices exist, control passes from block 688 to block 676 via line 690. However, if at least one such isolated wireless field device does exist, control passes to block 692, where tool 400 will assign the isolated wireless field device to its original wireless process mesh network. Once this assignment is complete, control passes to block 676 where tool 400 will display the results to a user and then end at node 678.

Figure 11:
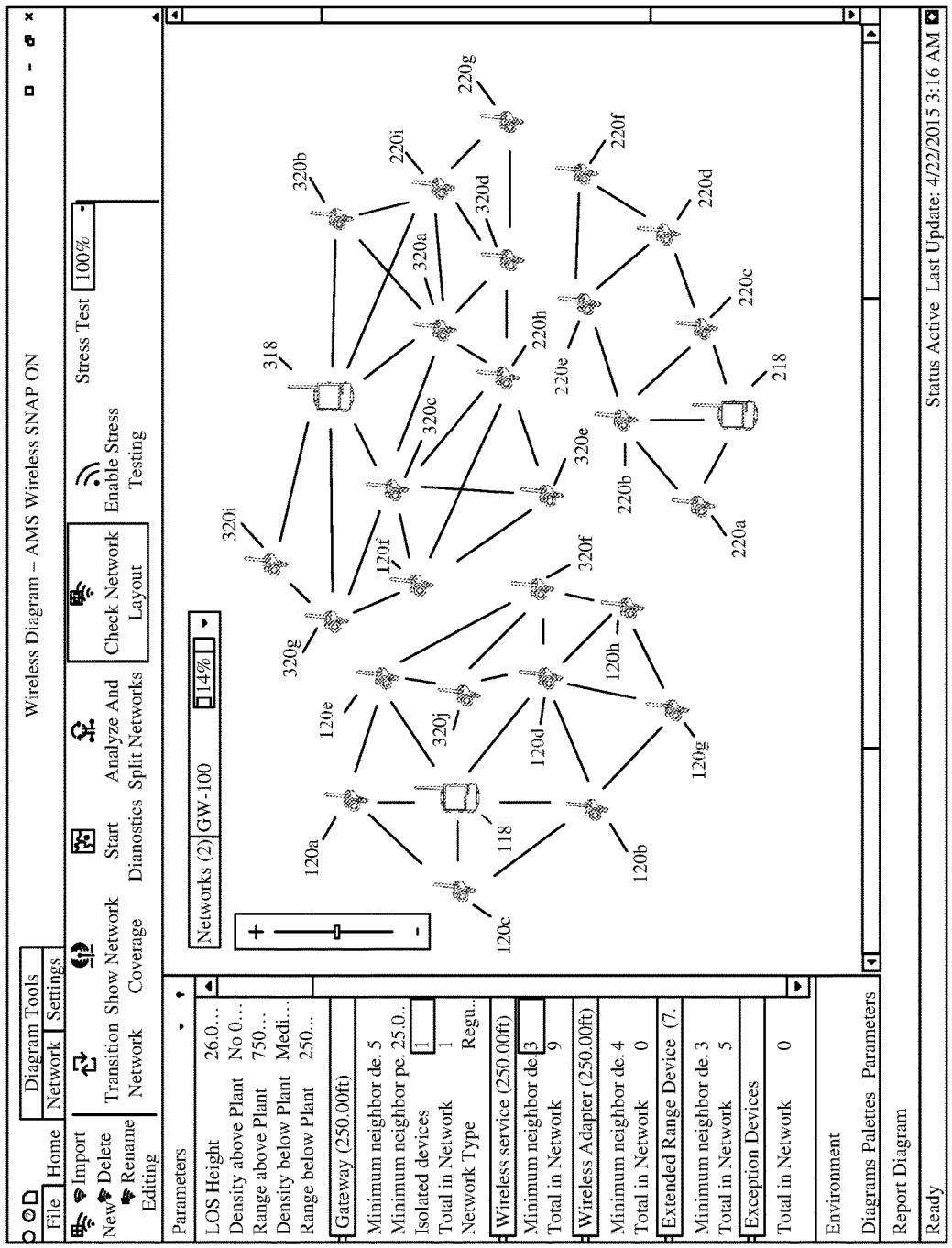
FIG. 11 is a diagrammatic view of a screen of a graphical user interface depicting three distinct wireless process mesh networks as configured after execution of a wireless process mesh network configuration tool in accordance with an embodiment of the present invention.

FIG. 11 is a diagrammatic view of a screen of a graphical user interface depicting three distinct wireless process mesh networks as configured after execution of a wireless process mesh network configuration tool in accordance with an embodiment of the present invention. For ease of contrast, FIG. 11 has each of the wireless gateways 118, 218, and 318 located in their precise original location. Further still, all of the wireless field devices are located in their original positions. However, after reconfiguration of the wireless field devices, wireless gateway 318 supports a larger wireless process mesh network including wireless field devices 120f, 220g, 220h, and 220i. Further still, each and every wireless field device in the configuration shown in FIG. 11 is communicatively coupled to at least two neighbors. Accordingly, the pinch point (field device 320a in FIG. 2) has been eliminated since field device 320*a* is communicatively coupled to wireless field device 220*h*, 320*d*, 220*i*, and 320*b*. Thus, tool 400 has checked the various design parameters for each wireless process mesh network, and has generated a wireless network configuration where at least some of the wireless field devices have moved to a different wireless process mesh network in order to correct any issues.

Although the present invention has been described with reference to preferred embodiments, workers skilled in the art will recognize that changes may be made in form and detail without departing from the spirit and scope of the invention.

What is claimed is:

1. A system for visualizing and analyzing a wireless process mesh network for splitting the wireless process mesh network from a pre-split wireless process mesh network configuration into a plurality of post-split wireless process mesh networks, the system comprising:
   a processor;
   a user interface module configured to generate a user interface to receive a user-provided visual representation of the pr-split wireless process mesh network configuration and to receive user-provided mesh network design parameters;
   memory coupled to the processor and storing information indicative of the plurality of post-split wireless process mesh networks and associated wireless field devices; and
   an analysis module configured to receive the user-provided mesh network design parameters, analyze the information indicative of the plurality of post-split wireless process mesh networks and generate a wireless mesh network configuration visualization and wireless mesh network configuration information for the plurality of post-split wireless process mesh networks.

2. The system of claim 1, wherein the information indicative of the plurality of wireless process mesh networks includes a graphical representation of a process installation.

3. The system of claim 2, wherein the user interface is a graphical user interface configured to receive user inputs that position devices in the graphical representation of the process installation using a pointing device.

4. The system of claim 1, wherein the information indicative of the plurality of wireless process mesh networks includes a geographical location of a plurality of wireless gateways, each wireless gateway providing a respective wireless process mesh network.

5. The system of claim 1, wherein information indicative of the plurality of wireless process mesh networks includes a geographical location of each wireless field device in the plurality of wireless process mesh networks.

6. The system of claim 1, wherein information indicative of the plurality of wireless process mesh networks includes a geographical location of at least one obstruction.

7. The system of claim 1, wherein the user-provided mesh network design parameters includes a minimum number of neighbors required for each wireless field device.

8. The system of claim 1, wherein the user-provided mesh network design parameters includes an effective range for each wireless gateway.

9. The system of claim 1, wherein the user-provided mesh network design parameters includes a minimum number of wireless field devices that are able to directly communicate with a wireless gateway.

10. The system of claim 1, wherein the user interface is configured to display a result based on the alternate wireless mesh network configuration.

11. The system of claim 1, and further comprising a network communication interface coupled to the processor and configured to communicate with at least one wireless gateway to obtain at least some of the information indicative of the plurality of wireless process mesh networks.

12. The system of claim 1, wherein the plurality of wireless process mesh networks are WirelessHART process mesh networks.

13. A method of generating wireless process mesh network configurations, the method comprising:
   receiving mesh network design parameters, wherein at least one mesh network design parameter is a user-provided mesh network design parameter input through a user input mechanism;
   receiving information indicative of a plurality of potential wireless process mesh networks, and information indicative of associated wireless field devices;
   responsively analyzing, using a processor, the plurality of potential wireless process mesh networks using the mesh network design parameters;
   generating, using the processor, an alternate wireless process mesh network configuration based on the analysis of the plurality of potential wireless process mesh networks and the mesh network design parameters;
   displaying the alternate wireless process mesh network configuration on a user interface display; and
   wherein analyzing the plurality of wireless process mesh networks includes a first phase wherein of a core network is created comprising wireless field devices that are A closest to each respective wireless gateway and communicate directly with said each respective wireless gateway.

14. The method of claim 13, wherein analyzing the plurality of wireless process mesh networks includes a second phase wherein remaining wireless field devices are assigned that can reach each respective wireless gateway.

15. The method of claim 14, wherein analyzing the plurality of wireless process mesh networks includes a third phase remaining wireless field devices distribution is performed for wireless field devices that are beyond any wireless gateway's range.

16. The method of claim 13, wherein the wireless process mesh networks are WirelessHART process mesh networks.

17. The method of claim 13, wherein the mesh network design parameters are received from a user through a user interface.

18. The method of claim 13, wherein at least some of the information indicative of a plurality of wireless process mesh networks and associated wireless field devices is received from a wireless gateway via a network communication interface.

19. The method of claim 13, wherein the alternate wireless process mesh network configuration includes at least one wireless field device that is assigned to a different wireless process mesh network.

* * * * *